US011161417B2

(12) United States Patent
Bessho et al.

(10) Patent No.: US 11,161,417 B2
(45) Date of Patent: Nov. 2, 2021

(54) VEHICLE WITH MAXIMUM VEHICLE SPEED SETTING UNIT

(71) Applicant: Kubota Corporation, Osaka (JP)

(72) Inventors: Hiroki Bessho, Sakai (JP); Takeshi Satozono, Sakai (JP); Noriyasu Honjo, Sakai (JP)

(73) Assignee: Kubota Corporation, Osaka (JP)

( * ) Notice: Subject to any disclaimer, the term of this patent is extended or adjusted under 35 U.S.C. 154(b) by 22 days.

(21) Appl. No.: 15/835,657

(22) Filed: Dec. 8, 2017

(65) Prior Publication Data

US 2018/0236896 A1 Aug. 23, 2018

(30) Foreign Application Priority Data

Feb. 17, 2017 (JP) .............................. JP2017-028233

(51) Int. Cl.
*B60R 22/48* (2006.01)
*B60W 30/188* (2012.01)
(Continued)

(52) U.S. Cl.
CPC .............. *B60L 15/20* (2013.01); *B60K 31/00* (2013.01); *B60L 15/2045* (2013.01); *B60R 21/017* (2013.01); *B60R 21/0132* (2013.01); *B60R 21/01544* (2014.10); *B60R 21/02* (2013.01); *B60R 22/48* (2013.01); *B60W 30/143* (2013.01); *F02D 29/02* (2013.01); *F02D 31/009* (2013.01); *F02D 41/0087* (2013.01); *B60L 2240/12* (2013.01); *B60L 2240/16* (2013.01); *B60L 2240/421* (2013.01); *B60L 2250/22* (2013.01);
(Continued)

(58) Field of Classification Search
None
See application file for complete search history.

(56) References Cited

U.S. PATENT DOCUMENTS 8,464,824 B1 6/2013 Reisenberger
8,548,710 B1 10/2013 Reisenberger
(Continued)

FOREIGN PATENT DOCUMENTS

| JP | H1044828 A | 2/1998 |
| JP | 2015100225 A | 5/2015 |
| JP | 201731897 A | 2/2017 |

*Primary Examiner* — Adam D Tissot
*Assistant Examiner* — Laura E Linhardt
(74) *Attorney, Agent, or Firm* — The Webb Law Firm

(57) ABSTRACT

A vehicle includes a body holding device configured to hold the body of a seated driver; a travel control unit configured to drive the vehicle body so that it travels; and a maximum vehicle speed setting unit configured to set a set maximum vehicle speed. The travel control unit controls an output from the driving unit based on the operation amount of an accelerator device if the vehicle speed is lower than the set maximum vehicle speed, and restricts the output from the driving unit irrespective of the operation amount of the accelerator device if the vehicle speed is equal to or higher than the set maximum vehicle speed. The maximum vehicle speed setting unit sets, if it is detected that the body holding device is worn, a first vehicle speed as the set maximum vehicle speed, and sets, if it is detected that the body holding device is not worn, a second vehicle speed lower than the first vehicle speed as the set maximum vehicle speed.

4 Claims, 3 Drawing Sheets

(51) Int. Cl.
  *B60W 50/00*   (2006.01)
  *F16H 61/00*   (2006.01)
  *B60K 28/02*   (2006.01)
  *B60L 15/20*   (2006.01)
  *B60R 21/017*  (2006.01)
  *B60R 21/015*  (2006.01)
  *B60R 21/02*   (2006.01)
  *B60R 21/0132* (2006.01)
  *B60W 30/14*   (2006.01)
  *F02D 31/00*   (2006.01)
  *B60K 31/00*   (2006.01)
  *F02D 41/00*   (2006.01)
  *F02D 29/02*   (2006.01)
  *B60R 21/01*   (2006.01)
  *F02D 41/22*   (2006.01)

(52) U.S. Cl.
  CPC ............... *B60R 2021/01265* (2013.01); *B60R 2022/4808* (2013.01); *B60W 2540/10* (2013.01); *F02D 2041/227* (2013.01); *F02D 2200/501* (2013.01); *Y02T 10/72* (2013.01)

(56) References Cited

U.S. PATENT DOCUMENTS

| | | | |
|---|---|---|---|
| 8,781,705 B1 | 7/2014 | Reisenberger | |
| 2005/0049108 A1* | 3/2005 | Nishizawa | B60W 30/1819 477/37 |
| 2013/0207773 A1* | 8/2013 | Hathaway | B60K 28/12 340/3.43 |
| 2016/0075305 A1* | 3/2016 | Kawakatsu | B60K 31/02 280/801.1 |
| 2017/0036544 A1 | 2/2017 | Satozono et al. | |
| 2017/0284540 A1* | 10/2017 | Sakamoto | B60R 22/48 |
| 2018/0065596 A1* | 3/2018 | Makabe | B60W 30/182 |
| 2018/0222441 A1* | 8/2018 | Koase | B60R 22/48 |

* cited by examiner

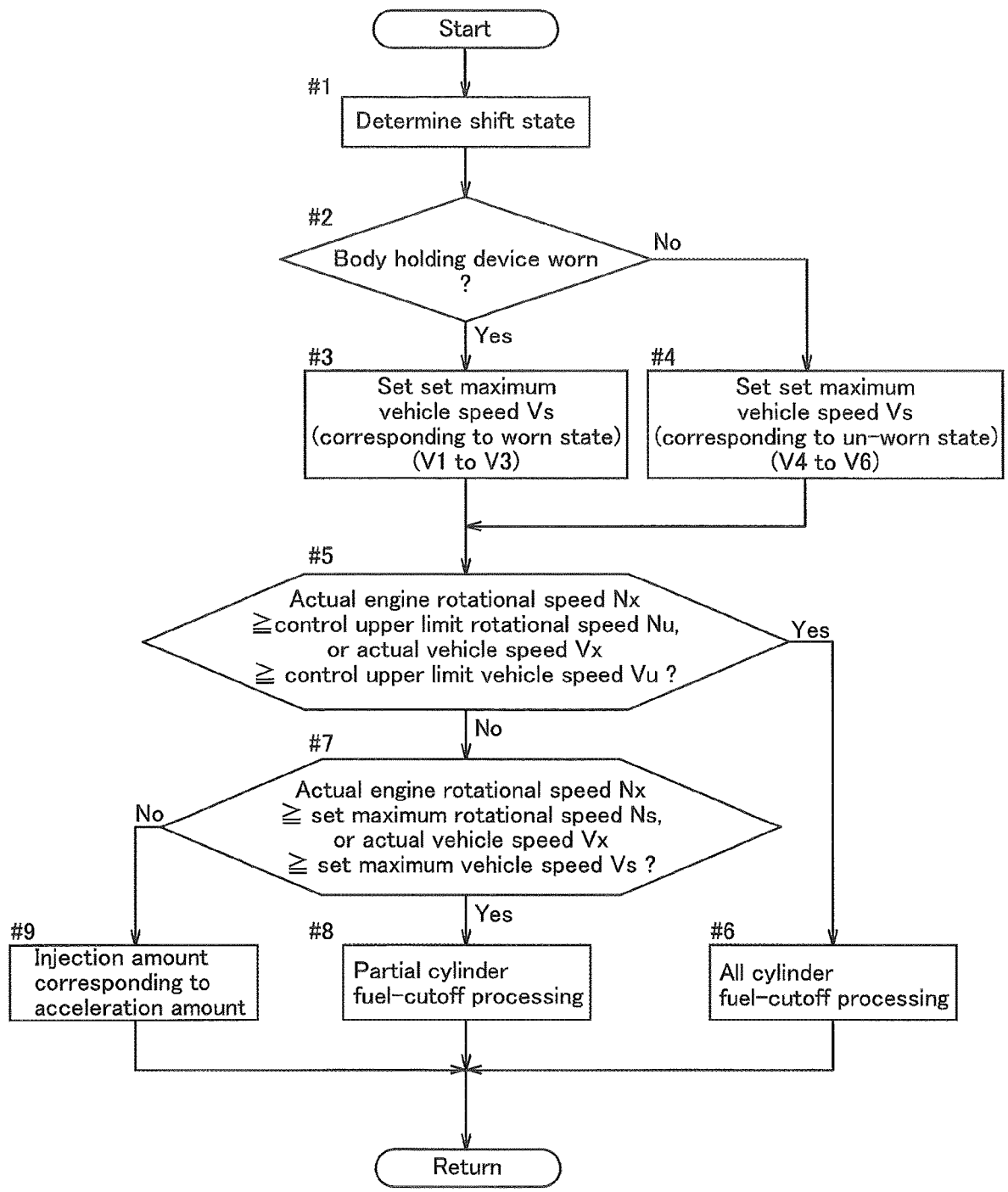

VEHICLE WITH MAXIMUM VEHICLE SPEED SETTING UNIT

CROSS-REFERENCE TO RELATED APPLICATION

This application claims priority to Japanese Patent Application No. 2017-028233 filed Feb. 17, 2017, the disclosure of which is hereby incorporated in its entirety by reference.

BACKGROUND OF THE INVENTION

1. Field of the Invention

The present invention relates to a vehicle that travels using the motive power generated by a driving unit such as an engine or an electric motor.

2. Description of the Related Art

The travel vehicle body of this type of vehicle is driven by the motive power generated by the driving unit, and the travel drive power is adjusted in accordance with an operation of a man-operable accelerator device. Conventionally, as disclosed in JP 2015-100225 A, a vehicle has been proposed that is configured to restrict the travel drive power irrespective of the operation amount of the accelerator device, if the traveling speed (vehicle speed) of the travel vehicle body exceeds a set vehicle speed. In this vehicle, the set vehicle speed is always set to the same value.

The vehicle as described above includes a body holding device such as a seat belt that holds the body of the driver, in order to suppress the posture of the driver from becoming unstable when he or she is seated on the driving seat, and enhance the safety of the driver.

If such a body holding device is provided in a usable state, it is possible to suppress the posture of the driver from becoming unstable and enhance the safety of the driver, even if the vehicle is traveling at a relatively high vehicle speed. However, there may be cases where the driver, while sitting on the driving seat, forgets to wear a body holding device (for example, a seat belt) as described above.

In the above-described configuration, the set vehicle speed is always set to the same value, and thus is constant irrespective of whether a body holding device is worn or not worn. However, the set vehicle speed is set in advance on the assumption that the body holding device is worn, and thus there are disadvantages in that, if the vehicle is operated and driven in a state in which the body holding device is not worn, then the travel vehicle body may largely swing due to an excessively high vehicle speed, causing the posture of the driver to be unstable.

Accordingly, a vehicle that reduces the risk that the posture of a driver will become unstable not only when a body holding device is worn but also when the body holding device is not worn is in demand. In view thereof, a vehicle as under is proposed.

SUMMARY OF THE INVENTION

A vehicle comprising:
 a driving unit configured to drive a vehicle body;
 a body holding device configured to hold a body of a seated driver;
 a man-operable accelerator device;
 a vehicle speed sensor configured to detect a vehicle speed;
 a worn state detecting sensor configured to detect whether the body holding device is in a worn state or in an un-worn state;
 a travel control unit configured to control an output from the driving unit,
  the travel control unit being configured to control the output from the driving unit based on an operation amount of the accelerator device, if the vehicle speed is lower than a set maximum vehicle speed, and
  the travel control unit being configured to restrict the output from the driving unit irrespective of the operation amount of the accelerator device, if the vehicle speed is equal to or higher than the set maximum vehicle speed; and
 a maximum vehicle speed setting unit configured to set the set maximum vehicle speed,
  the maximum vehicle speed setting unit being configured to set, if the worn state is detected by the worn state detecting sensor, a first vehicle speed as the set maximum vehicle speed, and
  the maximum vehicle speed setting unit being configured to set, if the un-worn state is detected by the worn state detecting sensor, a second vehicle speed, which is lower than the first vehicle speed, as the set maximum vehicle speed.

According to this configuration, when the worn state is detected by the worn state detecting sensor, if the vehicle speed is lower than the first vehicle speed, the travel control unit controls the output from the driving unit so that the output corresponds to the operation amount of the accelerator device, and if the vehicle speed is equal to or higher than the first vehicle speed, the travel control unit restricts the output from the driving unit irrespective of the operation amount of the accelerator device.

On the other hand, when the un-worn state is detected by the worn state detecting sensor, if the vehicle speed is lower than the second vehicle speed, which is lower than the first vehicle speed, the travel control unit controls the output from the driving unit so that the output corresponds to the operation amount of the accelerator device, and if the vehicle speed is equal to or higher than the second vehicle speed, the travel control unit restricts the output from the driving unit irrespective of the operation amount of the accelerator device.

As a result, in the un-worn state, the output from the driving unit is restricted at a vehicle speed lower than that in the worn state, and thus the vehicle speed in the un-worn state is prevented from becoming excessively high, resulting in the posture of the driver being unlikely to become unstable. Accordingly, it is possible to provide a vehicle in which the posture of a driver is unlikely to become unstable in both states.

According to one preferred embodiment, the driving unit is an engine including a plurality of cylinders, and the travel control unit includes an engine control unit that is configured to restrict the output from the driving unit by restricting an injection amount of fuel to be supplied to a portion of or all of the plurality of cylinders.

With this configuration, if the vehicle speed of the vehicle body that is traveling using the drive power generated by the engine is equal to or higher than the set maximum vehicle speed, then the injection amount of fuel to be supplied to a portion of or all of the plurality of cylinders is restricted, and thus the output from the engine is restricted. As a result, it is possible to prevent an excessively large load from being applied to the engine, and suppress the vehicle speed from increasing more than necessary.

In other words, if the injection amount of fuel to be supplied to a portion of the plurality of cylinders is restricted, then fuel injection is continuously performed on the remaining cylinder, and thus it is possible to suppress and reduce abnormal noise generated by the engine due to the restriction of the fuel injection amount, and reduce a sense of unpleasantness caused by the noise. On the other hand, if the injection amount of fuel to be supplied to all of the cylinders is restricted, then the restriction of the vehicle speed is significantly effective, and it is possible to immediately restrict the vehicle speed.

According to one preferred embodiment, the vehicle further comprises a change speed device configured to be switchable between a plurality of shift states having different speed transmission ratios, and to shift drive power generated by the engine to transmit the shifted drive power to travel devices, wherein the maximum vehicle speed setting unit is configured to set, for each of the first and second vehicle speeds, vehicle speeds different between the plurality of shift states.

With this configuration, in each of the cases where the body holding device is worn and where the body holding device is not worn, vehicle speeds different between the plurality of shift states are set as set maximum vehicle speeds. Also, the output from the engine is controlled so that the vehicle speed does not exceed the corresponding set maximum vehicle speed set for the relevant shift state.

According to another preferred embodiment, the vehicle further comprises an engine rotation sensor configured to detect a rotational speed of the engine, wherein, if the rotational speed of the engine is equal to or higher than a set maximum rotational speed, the engine control unit is configured to restrict the injection amount of fuel to be supplied to the engine irrespective of the operation amount of the accelerator device. Alternatively, the vehicle further comprises an engine rotation sensor configured to detect a rotational speed of the engine, wherein, if the rotational speed of the engine is equal to or higher than a set maximum rotational speed, the engine control unit is configured to restrict the injection amount of fuel to be supplied to the engine irrespective of the operation amount of the accelerator device.

With the above, if the rotational speed of the engine is equal to or higher than the set maximum rotational speed, then the injection amount of fuel to be supplied to the engine is restricted. Accordingly, it is possible to prevent, for example, such a situation that the engine operates at an overspeed that is the set maximum rotational speed or higher, and is placed under an excessive load.

The above described body holding device is preferably, for example, a seat belt that holds the driver to protect him or her against an abrupt swinging motion, or a laterally supporting device that is provided on the lateral sides of the driver to prevent the driver from laterally falling even if the vehicle body swings laterally.

Other features and advantageous effects exerted therefrom will become apparent by reading the description below with reference to the accompanying drawings.

BRIEF DESCRIPTION OF THE DRAWINGS

FIG. 3 is a flowchart of a control operation.

DETAILED DESCRIPTION OF PREFERRED EMBODIMENTS

Power Transmission System of Vehicle

Figure 1:
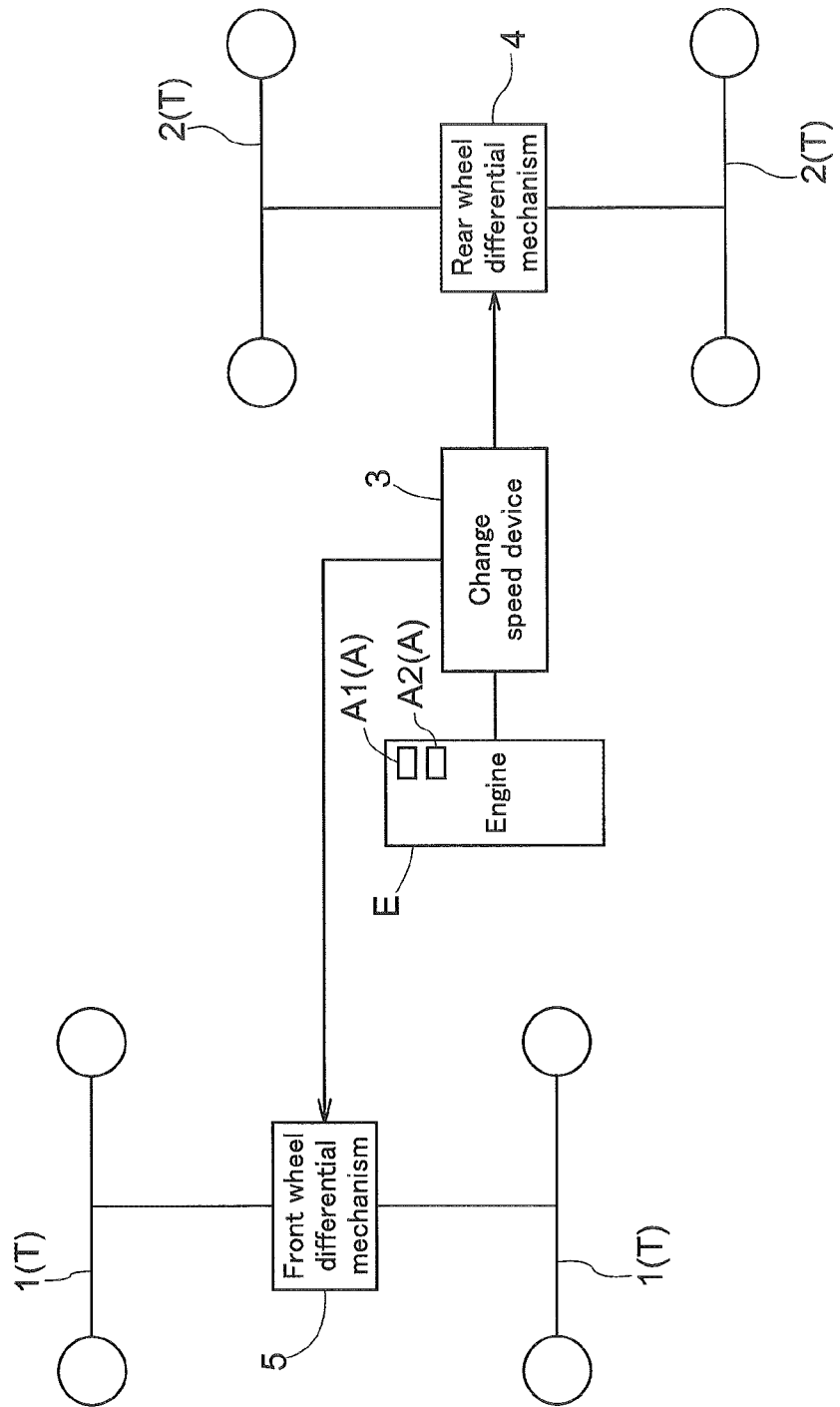
FIG. 1 is a diagram illustrating a power transmission system of a vehicle according to one embodiment.

As shown in FIG. 1, a vehicle includes a travel vehicle body that includes a pair of right and left front wheels 1 and a pair of right and left rear wheels 2, which serve as travel devices T, the travel vehicle body including an engine E (an example of a driving unit) with a plurality of cylinders A, and a change speed device 3 that shifts an output from the engine E and transmits the shifted output to the front wheels 1 and the rear wheels 2.

The change speed device 3 is switchable between multiple shift states having different speed transmission ratios. Specifically, the shift state of the change speed device 3 is switchable between a forward-first speed state, a forward-second speed state, a neutral state and a reverse state. The forward-first speed state, the forward-second speed state and the reverse state have different speed transmission ratios. In the neutral state, power transmission is interrupted, and travel of the travel vehicle body is stopped.

The motive power outputted from the change speed device 3 is transmitted to the right and left rear wheels 2 via a rear wheel differential mechanism 4, and is also transmitted to the right and left front wheels 1 via a front wheel differential mechanism 5.

When the change speed device 3 is in the forward-first speed state, the vehicle body travels forward at a low speed; and when the change speed device 3 is in the forward-second speed state, the vehicle body travels forward at a speed higher than in the forward-first speed state. When the change speed device 3 is in the neutral state, travel of the vehicle body is stopped. When the change speed device 3 is in the reverse state, the vehicle body travels rearward.

Figure 2:
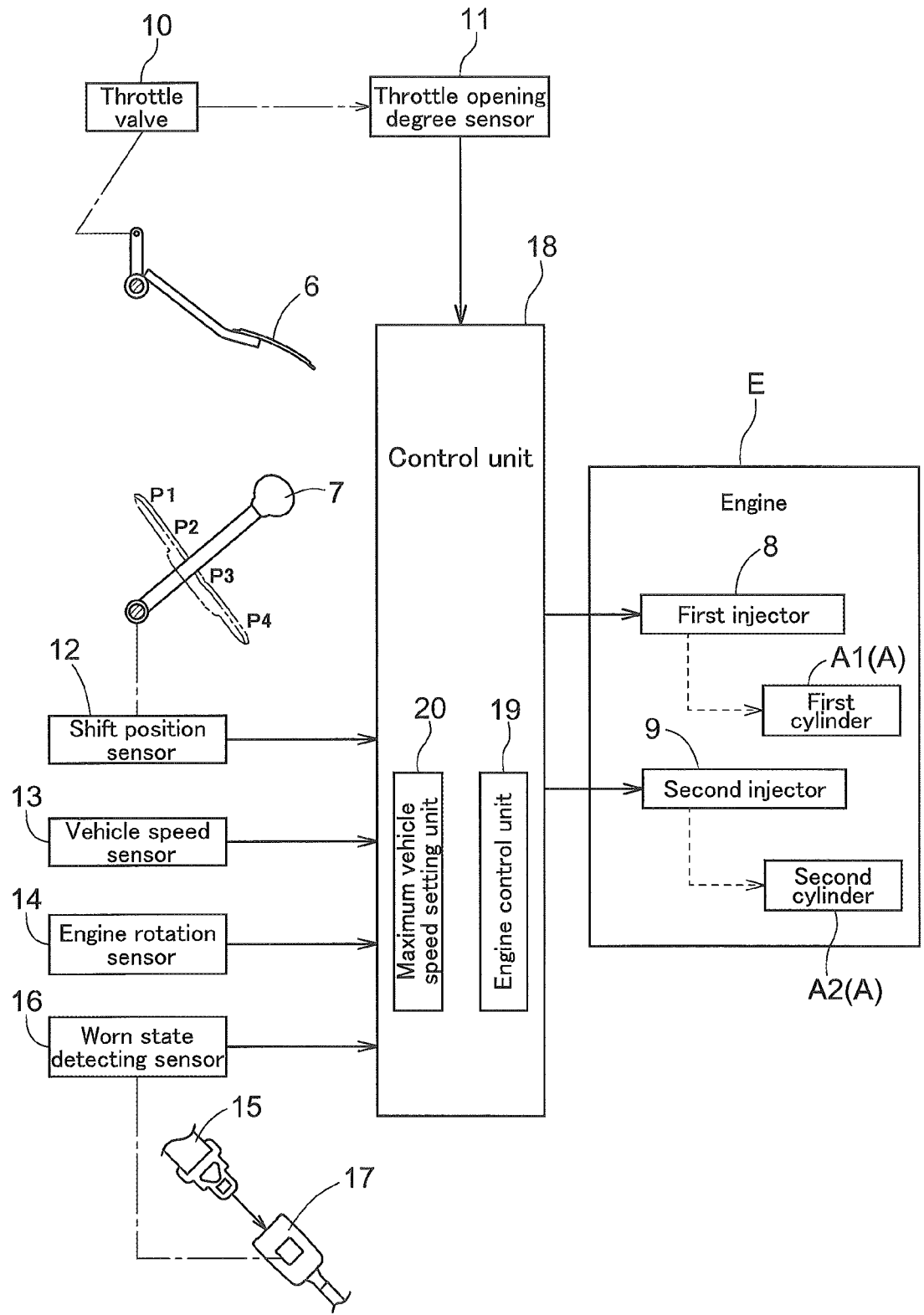
FIG. 2 is a control block diagram of the vehicle.

As shown in FIG. 2, the vehicle body includes: a pedal-type accelerator device 6 for changing a traveling speed of the vehicle; a shift lever 7 for effecting a speed change operation; a driving seat (not shown) on which a passenger can sit, and the like. The accelerator device 6 is configured to be pressed down by a foot, and is urged to return to its home position when the foot is removed. The shift lever 7 is manually pivotable to be switched to one of a forward-first speed position P1, a forward-second speed position P2, a neutral position P3 and a reverse position P4.

Control Block Diagram of Vehicle

As shown in FIG. 2, the engine E includes the plurality of cylinders, namely, a first cylinder A1 and a second cylinder A2. A first injector 8 is configured to inject misted fuel into the first cylinder A1. A second injector 9 is configured to inject misted fuel into the second cylinder A2. The first cylinder A1 and the second cylinder A2 are operable alternately to each other.

A throttle valve 10 that adjusts the supply amount of combustion air is provided on a path on which combustion air is taken into the engine. The throttle valve 10 is operated in response to an operation of the accelerator device 6.

The vehicle body includes: a throttle opening degree sensor 11 that detects the opening degree of the throttle valve 10 which is operable by the accelerator device 6; a shift position sensor 12 that detects the operation position of the shift lever 7; a vehicle speed sensor 13 that detects the traveling speed of the vehicle body (vehicle speed); an engine rotation sensor 14 that detects the rotational speed of the engine E; a worn state detecting sensor 16 that detects whether a seat belt 15 (an example of a body holding device)

provided on the driving seat is in a state of being worn (referred to as "worn state" or "first state") or in a state of not being worn ("un-worn state" or "second state"). The worn state detecting sensor 16 is provided on an insertion anchor unit 17 into which the front end portion of the seat belt 15 is inserted.

The vehicle body includes a control unit 18 that controls the output from the engine E by changing and adjusting the injection amount of fuel to be supplied to the first cylinder A1 and the second cylinder A2 of the engine E. The control unit 18 is configured to include a microcomputer.

The control unit 18 includes: an engine control unit 19 (an example of a travel control unit) and a maximum vehicle speed setting unit 20. The engine control unit 19 controls, if the vehicle speed is lower than a set maximum vehicle speed Vs, the injection amount of fuel to be supplied to the engine E based on the operation amount of the accelerator device 6; and restricts, if the vehicle speed is equal to or higher than the set maximum vehicle speed, the injection amount of fuel to be supplied to the engine E irrespective of the operation amount of the accelerator device. The maximum vehicle speed setting unit 20 sets, if the worn state is detected by the worn state detecting sensor 16, a worn state corresponding vehicle speed (corresponding to a first vehicle speed) as the set maximum vehicle speed Vs, and sets, if the un-worn state is detected by the worn state detecting sensor 16, an un-worn state corresponding vehicle speed (corresponding to a second vehicle speed), which is lower than the worn state corresponding vehicle speed (first vehicle speed), as the set maximum vehicle speed Vs.

Data indicating a basic correspondence relationship between the operation amount of the accelerator device 6, which is the amount it is pressed down with a foot operation, and the target rotational speed of the engine E is stored in advance; and the engine control unit 19 adjusts, as processing based on the operation amount of the accelerator device 6, the injection amount of fuel to be supplied to the first cylinder A1 and the second cylinder A2 so that the actual rotational speed of the engine E is equal to the rotational speed that corresponds to the operation amount of the accelerator device 6.

The engine control unit 19 is configured to perform, as processing for restricting the injection amount of fuel to be supplied to the engine E, partial cylinder fuel-cutoff processing in which the fuel injection into the two cylinders A is alternately stopped, and all cylinder fuel-cutoff processing in which the fuel injection into both of the two cylinders A is stopped. In the partial cylinder fuel-cutoff processing, the engine control unit 19 is configured to switch the cylinder A to be subjected to restriction of the fuel injection amount alternately at every predetermined time.

The maximum vehicle speed setting unit 20 is configured to set, for each of the worn state corresponding vehicle speed (first vehicle speed) and the un-worn state corresponding vehicle speed (second vehicle speed), vehicle speeds that are different between the plurality of shift states as the set maximum vehicle speeds Vs, at which the processing for restricting the fuel injection amount (specifically, the partial cylinder fuel-cutoff processing to be described later) is started. In other words, based on the information regarding the operation position of the shift lever 7, it is determined which of the forward-first speed state, the forward-second speed state and the reverse state is the shift state of the change speed device 3, and based on the determined shift state, the set maximum vehicle speed Vs is set correspondingly thereto.

Specifically, as the worn state corresponding vehicle speed, a "forward-first/worn state corresponding maximum vehicle speed" V1 is set for the forward-first speed state, a "forward-second/worn state corresponding maximum vehicle speed" V2 is set for the forward-second speed state, and a "reverse/worn state corresponding maximum vehicle speed" V3 is set for the reverse state.

As the un-worn state corresponding vehicle speed, a "forward-first/un-worn state corresponding maximum vehicle speed" V4 is set for the forward-first speed state, a "forward-second/un-worn state corresponding maximum vehicle speed" V5 is set for the forward-second speed state, and a "reverse/un-worn state corresponding maximum vehicle speed" V6 is set for the reverse state.

Furthermore, for each of the plurality of shift states, a control upper limit vehicle speed, at which the all cylinder fuel-cutoff processing is started, is set. Specifically, values obtained by adding a predetermined value to the respective maximum vehicle speeds V1 to V6 are set as control upper limit vehicle speeds V7 to V12.

The control unit 18 is configured to not only perform processing for restricting the fuel injection amount if the vehicle speed is equal to or higher than the set maximum vehicle speed Vs, but also perform, if the actual rotational speed of the engine E (actual engine rotational speed) is equal to or higher than a set maximum rotational speed, the processing for restricting the injection amount of fuel to be supplied to the cylinders A of the engine E (specifically, the partial cylinder fuel-cutoff processing), irrespective of the operation amount of the accelerator device 6. Also, similar to the case of the set maximum vehicle speeds Vs, control upper limit rotational speeds Nu, at which the all cylinder fuel-cutoff processing is started, are set. The set maximum rotational speeds Ns and the control upper limit rotational speeds Nu are set in advance. The control upper limit rotational speeds Nu are each set to, for example, a value close to a limit rotational speed, which is a mechanical limit of the engine E; and the set maximum rotational speeds Ns are each set to a value that is lower than the limit rotational speed by a set amount, thus making it possible to prevent an excessively large load from being applied to the engine E.

Specific Control Operation

FIG. 3 is a flowchart of processing for controlling the engine. The control unit 18 is configured to repeatedly execute such processing at every set unit time.

First, based on information detected by the shift position sensor 12, it is determined which is the shift state of the change speed device 3—the forward-first speed state, the forward-second speed state or the reverse state (step #1). Then, based on information detected by the worn state detecting sensor 16, it is determined whether the body holding device (seat belt) 15 on the driving seat is in the worn state or in the un-worn state (step #2).

If the worn state is detected, then a worn state corresponding vehicle speed is set as the set maximum vehicle speed Vs (step #3). In other words, as the worn state corresponding vehicle speed, the forward-first/worn state corresponding maximum vehicle speed V1 is set if the shift state is the forward-first speed state; the forward-second/worn state corresponding maximum vehicle speed V2 is set if the shift state is the forward-second speed state; and the reverse/worn state corresponding maximum vehicle speed V3 is set if the shift state is the reverse state.

If the un-worn state is detected, then an un-worn state corresponding vehicle speed is set as the set maximum vehicle speed Vs (step #4). In other words, as the un-worn state corresponding vehicle speed, the forward-first/un-worn state corresponding maximum vehicle speed V4 is set if the shift state is the forward-first speed state; the forward-second/un-worn state corresponding maximum vehicle speed V5 is set if the shift state is the forward-second speed state; and the reverse/un-worn state corresponding maximum vehicle speed V6 is set if the shift state is the reverse state.

Next, if the actual engine rotational speed Nx detected by the engine rotation sensor 14 is equal to or higher than the control upper limit rotational speed Nu, or if the actual vehicle speed Vx, which is the actual traveling speed of the travel vehicle body, detected by the vehicle speed sensor 13 is equal to or higher than the control upper limit vehicle speed (corresponding to any of the control upper limit vehicle speeds V7 to V12), then the all cylinder fuel-cutoff processing is executed (steps #5 and #6). In other words, fuel injection into the first cylinder A1 and the second cylinder A2 by the first injector 8 and the second injector 9 is stopped.

If the actual engine rotational speed Nx is lower than the control upper limit rotational speed Nu, and is equal to or higher than the set maximum rotational speed Ns, or if the actual vehicle speed Vx is lower than the control upper limit vehicle speed (corresponding to any of the control upper limit vehicle speeds V7 to V12) and is equal to or higher than the set maximum vehicle speed Vs (corresponding to any of the maximum vehicle speeds V1 to V6), then the partial cylinder fuel-cutoff processing is executed (steps #7 and #8).

Partial Cylinder Fuel-Cutoff Processing

In the partial cylinder fuel-cutoff processing, a one-side fuel cutoff state and the other-side fuel cutoff state are alternately and repeatedly realized at every predetermined time.

The one-side fuel cutoff state is a state in which the first injector 8 is controlled so that the injection amount of fuel to be supplied to the first cylinder A1 of the two cylinders A is cut to zero, and the second injector 9 is controlled so that the injection amount of fuel to be supplied to the second cylinder A2 is equal to a value that corresponds to the operation amount of the accelerator device 6.

The other-side fuel cutoff state is a state in which the second injector 9 is controlled so that the injection amount of fuel to be supplied to the second cylinder A2 is cut to zero, and the first injector 8 is controlled so that the injection amount of fuel to be supplied to the first cylinder A1 is equal to a value that corresponds to the operation amount of the accelerator device 6.

As described above, in the partial cylinder fuel-cutoff processing, only a portion of the cylinders A is subjected to restriction of the fuel injection amount (cutting the fuel injection amount to zero), and the cylinder A that is subjected to restriction of the fuel injection amount is alternated with the other one. With this configuration, fluctuations in the temperatures and the loads between the first cylinder A1 and the second cylinder A2 can be suppressed, making it possible to restrict the maximum traveling speed of the travel vehicle body while preventing deterioration of durability of the engine E. Furthermore, it is possible to prevent fluctuations in the temperatures between an exhaust pipe that guides exhaust from the first cylinder A1, and an exhaust pipe that guides exhaust from the second cylinder A2.

If the actual engine rotational speed Nx is lower than the set maximum rotational speed Ns, and the actual vehicle speed Vx is lower than the set maximum vehicle speed, then the first injector 8 and the second injector 9 are controlled so that the injection amounts of fuel to be respectively supplied to the first cylinder A1 and the second cylinder A2 are equal to values that correspond to the operation amount of the accelerator device 6 (step #9).

As described above, the present invention is applicable to a vehicle that travels using the motive power generated by a driving unit such as an engine or an electric motor.

OTHER EMBODIMENTS

The following will describe other embodiments focusing only on differences from the foregoing embodiment.

(1) In the foregoing embodiment, cutting the injection amount of fuel to be supplied to the cylinders A to zero is taken as an example of restricting the injection amount of fuel to be supplied to the cylinders A, but the present invention is not limited thereto. For example, it is also possible to decrease the injection amount of fuel to be supplied to the cylinders A relative to the normal injection amount so as to restrict the injection amount of fuel to be supplied to the cylinders A.

(2) The foregoing embodiment has described a configuration in which the plurality of un-worn state corresponding maximum vehicle speeds V4 to V6 that correspond to shift states are set as the un-worn state corresponding vehicle speeds, which are the second vehicle speeds, but the present invention is not limited thereto. For example, a predetermined speed that is lower than the lowest speed of the plurality of worn state corresponding maximum vehicle speeds V1 to V3, which are the first vehicle speeds, may be set as the un-worn state corresponding maximum vehicle speed (second vehicle speed).

(3) In the foregoing embodiment, processing in which the two cylinders A that are subjected to restriction of the fuel injection amount are alternated with each other at every predetermined time is taken as an example of the processing of restricting the injection amount of fuel to be supplied to a portion of the plurality of cylinders, but the present invention is not limited thereto. For example, a configuration is also possible in which, if the temperature of the exhaust pipe for the cylinder A that is being subjected to restriction of the fuel injection amount is lowered to one less than a predetermined temperature, the target cylinder A to be subjected to restriction of the fuel injection amount is switched to the other one.

(4) In the foregoing embodiment, the engine E with the two cylinders A is taken as an example, but the present invention is not limited thereto. For example, an engine with three cylinders or more may also be used. In the case of an engine with three cylinders A or more, two cylinders A or more, serving as a portion of the plurality of cylinders A, may be subjected to restriction of the fuel injection amount.

(5) In the foregoing embodiment, the pedal-type pivotable device that is pressed down by a foot is taken as the accelerator device 6, but the present invention is not limited thereto. For example, another operation device may be used, such as a hand acceleration lever that is manually-operable and can be held at a predetermined position.

(6) In the foregoing embodiment, the seat belt is provided as the body holding device, but the present invention is not limited thereto. The body holding device may be a laterally supporting device (not shown) for preventing a driver seated on the driving seat from moving laterally outward. The laterally supporting device functions to support the driver if the vehicle body swings laterally while traveling, to prevent the driver from laterally falling. The laterally supporting device may be provided removably not to block a driver who is about to get in and get out of the driving seat.

(7) In the foregoing embodiment, the change speed device 3 is switchable between the forward-first speed state, the forward-second speed state and the reverse state, but the present invention is not limited thereto this. For example, a change speed device 3 may be configured to be switchable between at least four states having different speed transmission ratios, including a forward-third speed state.

(8) The foregoing embodiment is configured such that, if the rotational speed of the engine E is equal to or higher than the set maximum rotational speed, the injection amount of fuel to be supplied to the engine E is restricted irrespective of the operation amount of the accelerator device 6, but a configuration is also possible in which no such restriction processing is performed.

(9) In the foregoing embodiment, the engine E is provided as an example of the driving unit, but the present invention is not limited thereto. For example, an electric motor may be also used as the driving unit, or a hybrid drive mechanism that drives the vehicle in cooperation with an engine and an electric motor may be also provided.

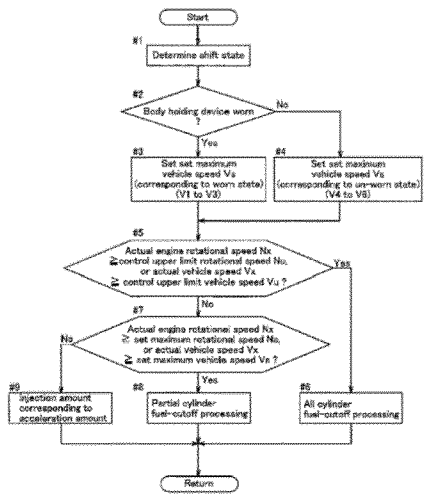

What is claimed is:

1. A vehicle comprising:
   a driving unit configured to drive a vehicle body;
   a body holding device configured to hold a body of a driver who is seated on a driving seat;
   a man-operable accelerator device;
   a vehicle speed sensor configured to detect a vehicle speed;
   a body holding state detecting sensor configured to detect whether the body holding device is in a first state in which the body holding device holds the driver on the driver seat, or in a second state in which the body holding device does not hold the driver on driver seat;
   a travel control unit configured to control an output from the driving unit,
      the travel control unit being configured to control the output from the driving unit based on an operation amount of the accelerator device, when the vehicle speed is lower than a set maximum vehicle speed,
      the travel control unit being configured to restrict the output from the driving unit irrespective of the operation amount of the accelerator device, when the vehicle speed is equal to or higher than the set maximum vehicle speed;
   a maximum vehicle speed setting unit configured to set the set maximum vehicle speed,
      the maximum vehicle speed setting unit being configured to set, when the first state is detected by the body holding state detecting sensor, a first vehicle speed as the set maximum vehicle speed, and
      the maximum vehicle speed setting unit being configured to set, when the second state is detected by the body holding state detecting sensor, a second vehicle speed, which is lower than the first vehicle speed, as the set maximum vehicle speed; and
   a change speed device configured to be switchable between a plurality of shift states having different speed transmission ratios, and to shift drive power generated by the engine to transmit the shifted drive power to travel devices,
   wherein the driving unit is an engine including a plurality of cylinders;
   wherein the travel control unit includes an engine control unit;
   wherein, when the second state is detected by the body holding state detecting sensor and when the vehicle speed detected by the vehicle speed sensor is equal to or higher than a control upper limit rotational speed, then the engine control unit is configured to restrict the output from the driving unit by restricting an injection amount of fuel to be supplied to all of the plurality of cylinders;
   wherein, when the second state is detected by the body holding state detecting sensor and when the vehicle speed detected by the vehicle speed sensor is lower than the control upper limit rotational speed and is equal to or higher than the set maximum vehicle speed, then the engine control unit is configured to restrict the output from the driving unit by restricting an injection amount of fuel to be supplied to a portion of the plurality of cylinders; and
   wherein the maximum vehicle speed setting unit is configured to set, for each of the first vehicle speed and the second vehicle speed, vehicle speeds different between the plurality of shift states; and
   wherein the maximum vehicle speed setting unit is configured to set the maximum vehicle speed of the vehicle speeds that are set for the second vehicle speed lower than the lowest speed of the vehicle speeds that is set for the first vehicle speed.

2. The vehicle according to claim 1, further comprising:
   an engine rotation sensor configured to detect a rotational speed of the engine,
   wherein, when the rotational speed of the engine is equal to or higher than a set maximum rotational speed, the engine control unit is configured to restrict the injection amount of fuel to be supplied to the engine irrespective of the operation amount of the accelerator device.

3. The vehicle according to claim 1, further comprising:
   an engine rotation sensor configured to detect a rotational speed of the engine,
   wherein, when the rotational speed of the engine is equal to or higher than a set maximum rotational speed, the engine control unit is configured to restrict the injection amount of fuel to be supplied to the engine irrespective of the operation amount of the accelerator device.

4. The vehicle according to claim 1, wherein the body holding device is a seat belt configured to hold the driver.

* * * * *

UNITED STATES PATENT AND TRADEMARK OFFICE
CERTIFICATE OF CORRECTION

| | |
|---|---|
| PATENT NO. | : 11,161,417 B2 |
| APPLICATION NO. | : 15/835657 |
| DATED | : November 2, 2021 |
| INVENTOR(S) | : Hiroki Bessho et al. |

It is certified that error appears in the above-identified patent and that said Letters Patent is hereby corrected as shown below:

On the Title Page

Delete the title page and substitute with the attached title page.

In the Claims

Column 9, Line 21, through Column 10, Line 54, delete Claims 1-4 as follows:
"1. A vehicle comprising:
a driving unit configured to drive a vehicle body;
a body holding device configured to hold a body of a driver who is seated on a driving seat;
a man-operable accelerator device;
a vehicle speed sensor configured to detect a vehicle speed;
a body holding state detecting sensor configured to detect whether the body holding device is in a first state in which the body holding device holds the driver on the driver seat, or in a second state in which the body holding device does not hold the driver on driver seat;
a travel control unit configured to control an output from the driving unit,
the travel control unit being configured to control the output from the driving unit based on an operation amount of the accelerator device, when the vehicle speed is lower than a set maximum vehicle speed,
the travel control unit being configured to restrict the output from the driving unit irrespective of the operation amount of the accelerator device, when the vehicle speed is equal to or higher than the set maximum vehicle speed;
a maximum vehicle speed setting unit configured to set the set maximum vehicle speed,
the maximum vehicle speed setting unit being configured to set, when the first state is detected by the body holding state detecting sensor, a first vehicle speed as the set maximum vehicle speed, and
the maximum vehicle speed setting unit being configured to set, when the second state is detected by the body holding state detecting sensor, a second vehicle speed, which is lower than the first vehicle speed, as the set maximum vehicle speed; and Signed and Sealed this
Thirty-first Day of October, 2023

*Katherine Kelly Vidal*

Katherine Kelly Vidal
*Director of the United States Patent and Trademark Office*

CERTIFICATE OF CORRECTION (continued)
U.S. Pat. No. 11,161,417 B2 a change speed device configured to be switchable between a plurality of shift states having different speed transmission ratios, and to shift drive power generated by the engine to transmit the shifted drive power to travel devices,
wherein the driving unit is an engine including a plurality of cylinders;
wherein the travel control unit includes an engine control unit;
wherein, when the second state is detected by the body holding state detecting sensor and when the vehicle speed detected by the vehicle speed sensor is equal to or higher than a control upper limit rotational speed, then the engine control unit is configured to restrict the output from the driving unit by restricting an injection amount of fuel to be supplied to all of the plurality of cylinders;
wherein, when the second state is detected by the body holding state detecting sensor and when the vehicle speed detected by the vehicle speed sensor is lower than the control upper limit rotational speed and is equal to or higher than the set maximum vehicle speed, then the engine control unit is configured to restrict the output from the driving unit by restricting an injection amount of fuel to be supplied to a portion of the plurality of cylinders; and
wherein the maximum vehicle speed setting unit is configured to set, for each of the first vehicle speed and the second vehicle speed, vehicle speeds different between the plurality of shift states; and
wherein the maximum vehicle speed setting unit is configured to set the maximum vehicle speed of the vehicle speeds that are set for the second vehicle speed lower than the lowest speed of the vehicle speeds that is set for the first vehicle speed.
2. The vehicle according to claim 1, further comprising:
an engine rotation sensor configured to detect a rotational speed of the engine,
wherein, when the rotational speed of the engine is equal to or higher than a set maximum rotational speed, the engine control unit is configured to restrict the injection amount of fuel to be supplied to the engine irrespective of the operation amount of the accelerator device.
3. The vehicle according to claim 1, further comprising:
an engine rotation sensor configured to detect a rotational speed of the engine,
wherein, when the rotational speed of the engine is equal to or higher than a set maximum rotational speed, the engine control unit is configured to restrict the injection amount of fuel to be supplied to the engine irrespective of the operation amount of the accelerator device.
4. The vehicle according to claim 1, wherein the body holding device is a seat belt configured to hold the driver."

And insert Claims 1-3 as follows:
-- 1. A vehicle comprising:
a driving unit configured to drive a vehicle body;
a body holding device configured to hold a body of a driver who is seated on a driving seat;
a man-operable accelerator device;
a vehicle speed sensor configured to detect a vehicle speed;
a body holding state detecting sensor configured to detect whether the body holding device is in a first state in which the body holding device holds the driver on the driver seat, or in a second state in which the body holding device does not hold the driver on driver seat;
a travel control unit configured to control an output from the driving unit,
the travel control unit being configured to control the output from the driving unit based on an operation amount of the accelerator device, when the vehicle speed is lower than a set maximum vehicle speed, the travel control unit being configured to restrict the output from the driving unit irrespective of the operation amount of the accelerator device, when the vehicle speed is equal to or higher than the set maximum vehicle speed;

a maximum vehicle speed setting unit configured to set the set maximum vehicle speed, the maximum vehicle speed setting unit being configured to set, when the first state is detected by the body holding state detecting sensor, a first vehicle speed as the set maximum vehicle speed, and the maximum vehicle speed setting unit being configured to set, when the second state is detected by the body holding state detecting sensor, a second vehicle speed, which is lower than the first vehicle speed, as the set maximum vehicle speed; and a change speed device configured to be switchable between a plurality of shift states having different speed transmission ratios, and to shift drive power generated by the engine to transmit the shifted drive power to travel devices, wherein the driving unit is an engine including a plurality of cylinders;

wherein the travel control unit includes an engine control unit;

wherein, when the second state is detected by the body holding state detecting sensor and when the vehicle speed detected by the vehicle speed sensor is equal to or higher than a control upper limit rotational speed, then the engine control unit is configured to restrict the output from the driving unit by restricting an injection amount of fuel to be supplied to all of the plurality of cylinders;

wherein, when the second state is detected by the body holding state detecting sensor and when the vehicle speed detected by the vehicle speed sensor is lower than the control upper limit rotational speed and is equal to or higher than the set maximum vehicle speed, then the engine control unit is configured to restrict the output from the driving unit by restricting an injection amount of fuel to be supplied to a portion of the plurality of cylinders; and wherein the maximum vehicle speed setting unit is configured to set, for each of the first vehicle speed and the second vehicle speed, vehicle speeds different between the plurality of shift states; and wherein the maximum vehicle speed setting unit is configured to set the maximum vehicle speed of the vehicle speeds that are set for the second vehicle speed, lower than the lowest speed of the vehicle speeds that is set for the first vehicle speed.

2. The vehicle according to claim 1, further comprising:

an engine rotation sensor configured to detect a rotational speed of the engine, wherein, when the rotational speed of the engine is equal to or higher than a set maximum rotational speed, the engine control unit is configured to restrict the injection amount of fuel to be supplied to the engine irrespective of the operation amount of the accelerator device.

3. The vehicle according to claim 1, wherein the body holding device is a seat belt configured to hold the driver. --

(12) United States Patent
Bessho et al.

(10) Patent No.: US 11,161,417 B2
(45) Date of Patent: Nov. 2, 2021

(54) VEHICLE WITH MAXIMUM VEHICLE SPEED SETTING UNIT

(71) Applicant: Kubota Corporation, Osaka (JP)

(72) Inventors: Hiroki Bessho, Sakai (JP); Takeshi Satozono, Sakai (JP); Noriyasu Honjo, Sakai (JP)

(73) Assignee: Kubota Corporation, Osaka (JP)

( * ) Notice: Subject to any disclaimer, the term of this patent is extended or adjusted under 35 U.S.C. 154(b) by 22 days.

(21) Appl. No.: 15/835,657

(22) Filed: Dec. 8, 2017

(65) Prior Publication Data
US 2018/0236896 A1 Aug. 23, 2018

(30) Foreign Application Priority Data
Feb. 17, 2017 (JP) .............................. JP2017-028233

(51) Int. Cl.
*B60R 22/48* (2006.01)
*B60W 30/188* (2012.01)
(Continued)

(52) U.S. Cl.
CPC .............. *B60L 15/20* (2013.01); *B60K 31/00* (2013.01); *B60L 15/2045* (2013.01); *B60R 21/017* (2013.01); *B60R 21/0132* (2013.01); *B60R 21/01544* (2014.10); *B60R 21/02* (2013.01); *B60R 22/48* (2013.01); *B60W 30/143* (2013.01); *F02D 29/02* (2013.01); *F02D 31/009* (2013.01); *F02D 41/0087* (2013.01); *B60L 2240/12* (2013.01); *B60L 2240/16* (2013.01); *B60L 2240/421* (2013.01); *B60L 2250/22* (2013.01);
(Continued)

(58) Field of Classification Search
None
See application file for complete search history.

(56) References Cited

U.S. PATENT DOCUMENTS 8,464,824 B1 6/2013 Reisenberger
8,548,710 B1 10/2013 Reisenberger
(Continued)

FOREIGN PATENT DOCUMENTS

| JP | H1044828 A | 2/1998 |
| JP | 2015100225 A | 5/2015 |
| JP | 201731897 A | 2/2017 |

*Primary Examiner* — Adam D Tissot
*Assistant Examiner* — Laura E Linhardt
(74) *Attorney, Agent, or Firm* — The Webb Law Firm

(57) ABSTRACT

A vehicle includes a body holding device configured to hold the body of a seated driver; a travel control unit configured to drive the vehicle body so that it travels; and a maximum vehicle speed setting unit configured to set a set maximum vehicle speed. The travel control unit controls an output from the driving unit based on the operation amount of an accelerator device if the vehicle speed is lower than the set maximum vehicle speed, and restricts the output from the driving unit irrespective of the operation amount of the accelerator device if the vehicle speed is equal to or higher than the set maximum vehicle speed. The maximum vehicle speed setting unit sets, if it is detected that the body holding device is worn, a first vehicle speed as the set maximum vehicle speed, and sets, if it is detected that the body holding device is not worn, a second vehicle speed lower than the first vehicle speed as the set maximum vehicle speed.

3 Claims, 4 Drawing Sheets